Figure 4:
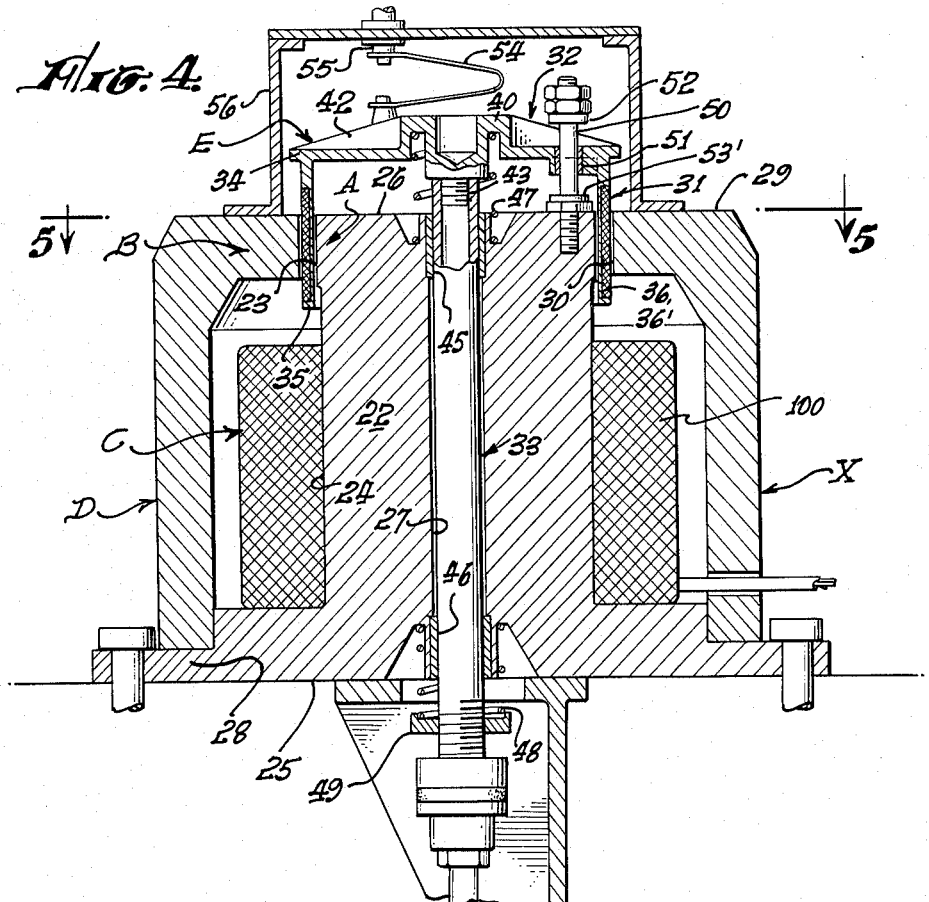

June 7, 1966 C. F. WEISGERBER 3,255,291
DYNAMIC CONTROL APPARATUS FOR ELECTRIC ARC
FURNACES AND THE LIKE
Filed Jan. 21, 1965 4 Sheets-Sheet 1
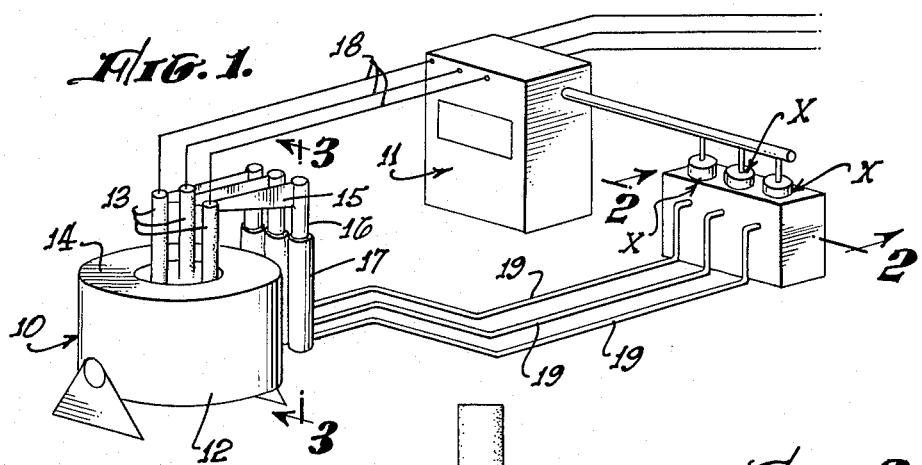
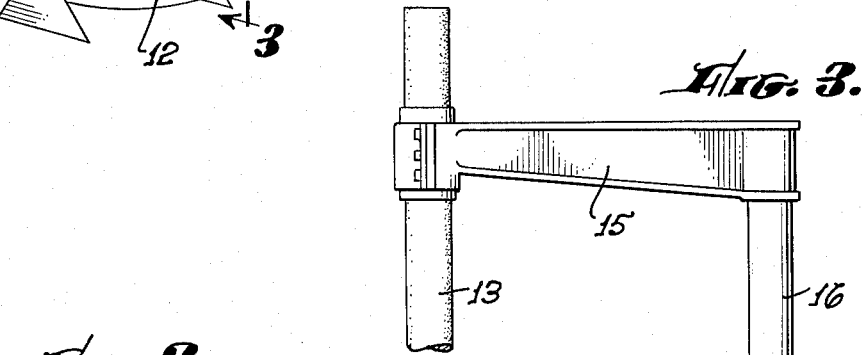
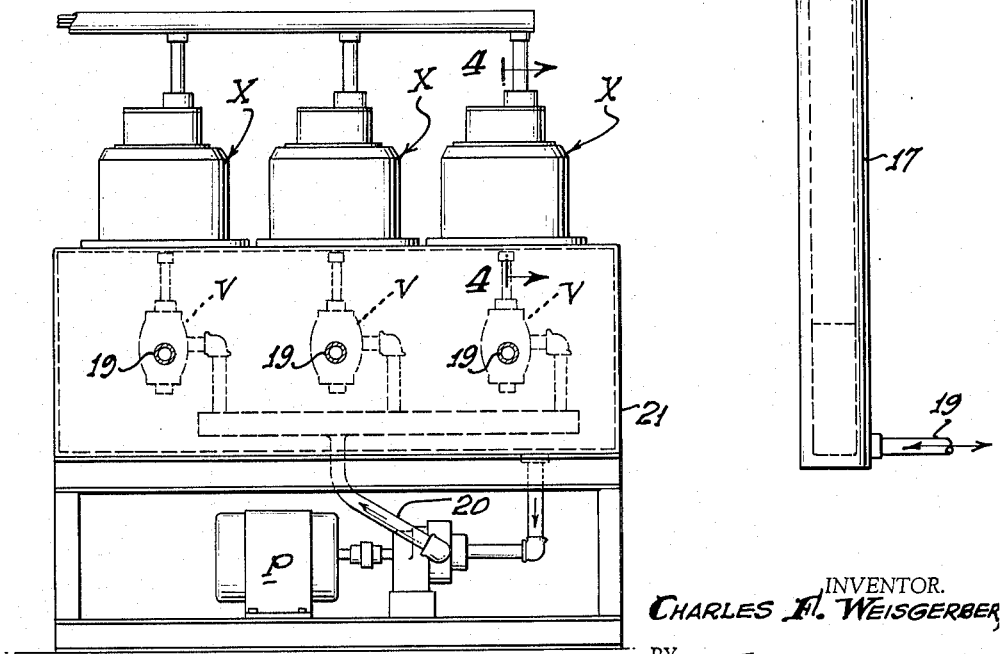
INVENTOR.
CHARLES F. WEISGERBER
BY
W. H. Maxwell
AGENT.

INVENTOR.
CHARLES F. WEISGERBER,
BY
W. H. Maxwell
AGENT.

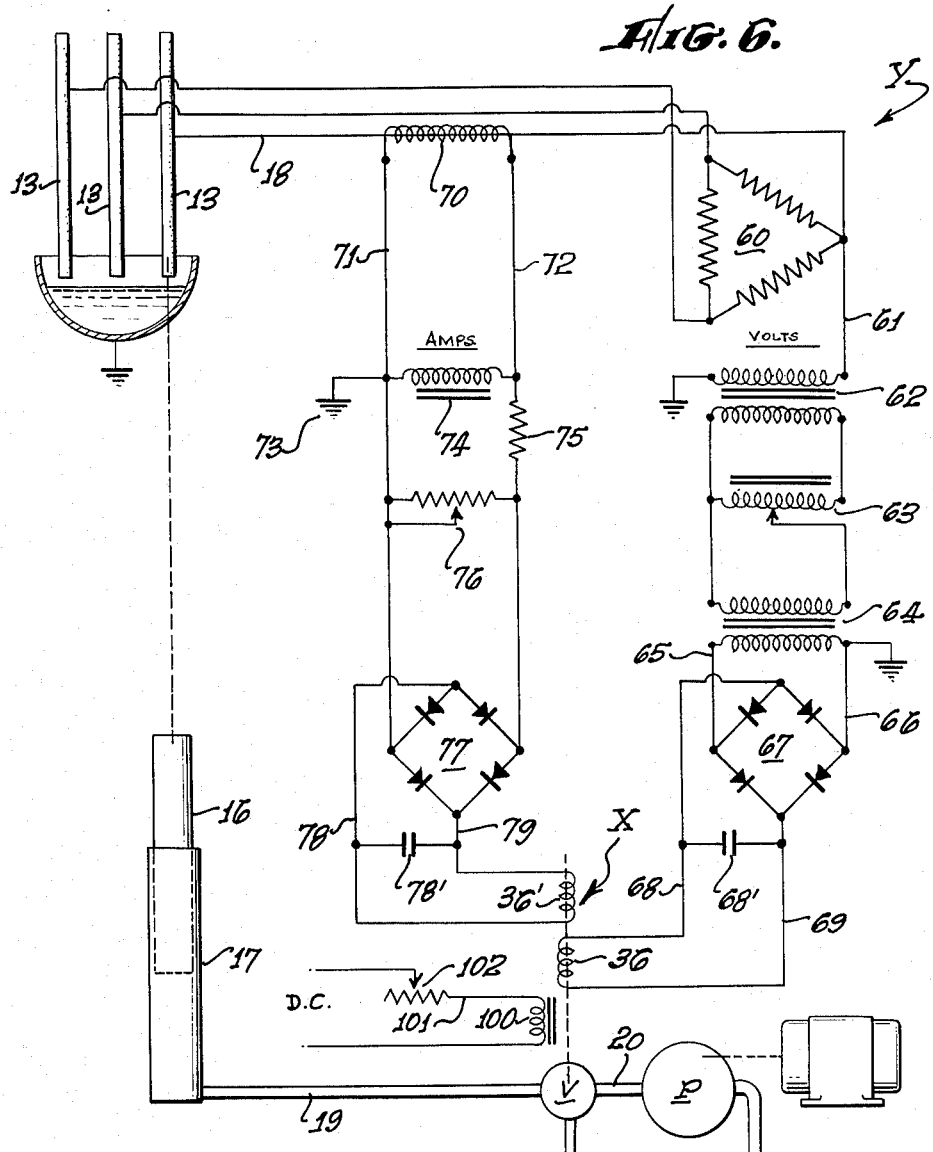

June 7, 1966  C. F. WEISGERBER  3,255,291
DYNAMIC CONTROL APPARATUS FOR ELECTRIC ARC
FURNACES AND THE LIKE
Filed Jan. 21, 1965  4 Sheets-Sheet 4
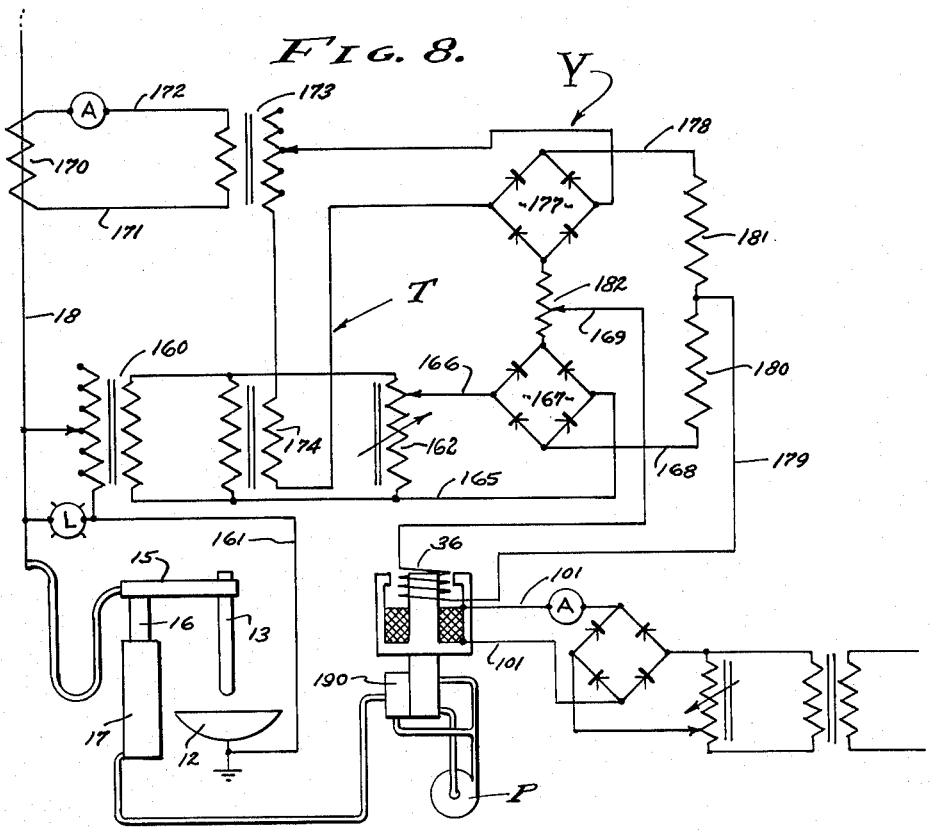
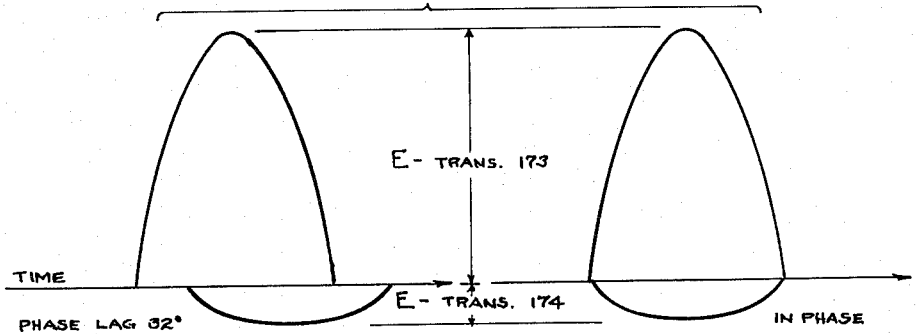
INVENTOR.
CHARLES F. WEISGERBER
BY
AGENT

United States Patent Office 3,255,291
Patented June 7, 1966

3,255,291
DYNAMIC CONTROL APPARATUS FOR ELECTRIC ARC FURNACES AND THE LIKE
Charles F. Weisgerber, P.O. Box 1489, Wickenburg, Ariz.
Filed Jan. 21, 1965, Ser. No. 427,074
12 Claims. (Cl. 13—13)

This is a continuation-in-part of the application Serial No. 30,862, filed May 23, 1960, now abandoned, and entitled Dynamic Control Apparatus. This invention has to do with a dynamic control apparatus and is particularly concerned with an electromagnetic means for infinitely varying the positioning of a thing, for example to position the controlling element of a fluid candling control valve in the electrode positioning mechanism of an electrical arc melting furance, it being a general object of this invention to provide an apparatus that is sensitive to certain conditions related to a thing and which then operates to position said thing in a direct, positive, accurate and predetermined manner.

A practical application of the present invention is disclosed herein as applied to an arc furnace control system wherein even a small boost in efficiency means a significant savings in operating economy. Electrode positioning means for electric arc furnaces have been many and varied, one of the earliest systems involving a contact-making ammeter and utilizing relays to energize control motors. A later device is the balanced beam design in which movement is achieved through the use of solenoids and which is presently in use on many steel melting installations. A characteristic of these regulation systems is the necessary individual motor for each electrode balanced and these motors are subject to frequent and rapid reversal, coupled with the fact that the contact making relays are of the direct current type characterized by frequent malfunction and costly maintenance. A more recent system, known as the rotating regulator system, requires individual electrode positioning motors for each phase involved, individual generators for each phase and additional individual motors to drive each of the said generators. However, the time constant of such equipment is relatively extended.

An electrode positioning means for electric arc furnaces is the electrohydraulic arc furnace control system wherein the electrode is positioned by a directly connected hydraulic ram. A control amplifier for this type of system involves a jet pipe relay that changes a small displacement into a large hydraulic pressure differential. This system is inherently non-linear and is subject to excessive hunting.

It is required that the above mentioned automatic electrode control system maintain a constant heat input to the furnace despite extreme and often violent load fluctuations. When melting begins there is sudden and frequent shifting of power input level and of the metal charge during which the electrodes should respond rapidly. Even after the metal is molten the arc presents erratic, continually changing conditions which the system should be capable of controlling. Heretofore, the process involved in electric arc furnaces of the type under consideration has been considered highly unstable since the prior art control systems, including those mentioned above, allow for excessive variations to occur. Even with the best control systems, response has not been fast enough to prevent periodic loss of arc, particularly at the beginning of the melt, and when the arc is lost the electrodes must be driven down until the arc is restruck, and this ordinarily results in the electrode being too close to the metal charge. Further, the metal charge acts as a common ground or common electrode for each of the three phases involved and reflects interaction among the three individual phases each of which requires a control system. For example, a change of arc length in one phase affects the voltage and current in the other two phases.

With the foregoing problems in mind it will be apparent that the very size of the large arc furnaces indicates that even small improvements in efficiency will effect great economy, particularly by reducing surges and fluctuations in the power circuits, which is prevalent in the prior art systems.

A general object of this invention is to provide a dynamic control apparatus that is simple and uncomplicated, mechanically as well as electrically, and in which the speed of infinite positioning varies proportionately with the degree of unbalance of the thing to be controlled thereby.

Another object of this invention is to provide a dynamic control apparatus that is electromagnetic and such as to infinitely vary the position of a thing proportionately in response to the condition of electric power that is associated with the position and movement of said thing to be positioned thereby.

It is another object of this invention to eliminate electrical contact means in a controller of the type under consideration, which ordinarily results in inefficient operation and which ordinarily allows the electrode of an electrical arc furnace to enter the molten metal bath and to cause undesirable carbon contamination. The electrical features of the present invention are such as to operate entirely without switching contacts, thus eliminating the usual sticking, or burned, or welded contacts which characterize ordinary electrical controls heretofore provided.

It is still another object of this invention to provide a dynamic control apparatus of the character thus far referred to that does not add an excessive electrical load on the current and voltage measuring equipment that would adversely affect the same.

Further, it is an object of this invention to provide apparatus in a controller of the character referred to that is extremely effective in the infinitely variable positioning of components, directly or through servo systems, as circumstances require.

Also, it is an object of this invention to provide a controller apparatus having a minimum number of mechanical and electrical parts thereby to reduce maintenance, all of which are adequately shielded and protected to assure reliable and predictable operation.

Figure 5:
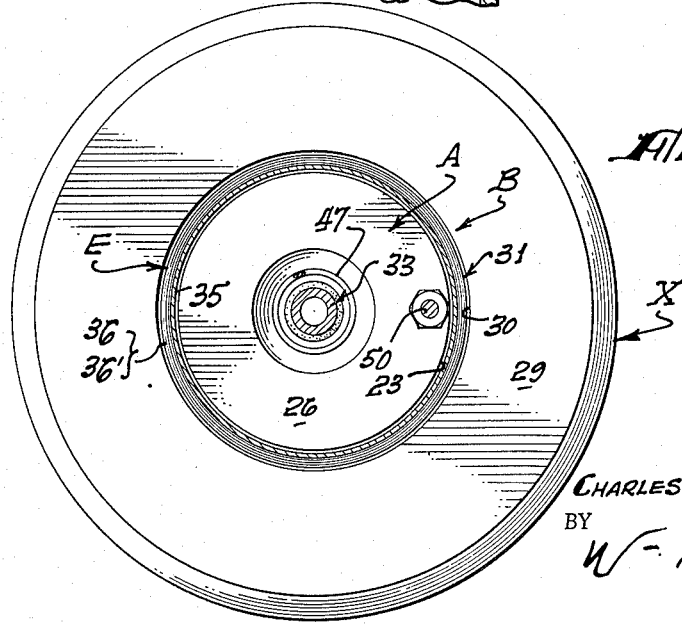

The various objects and features of my invention will be fully understood from the following detailed description thereof, throughout which description reference is made to the accompanying drawings, in which:

FIG. 1 is a diagrammatic and perspective view of a typical application of the present invention to an electrical arc furnace. FIG. 2 is an enlarged sectional view taken as indicated by line 2–2 on FIG. 1 and shows a bank of controller elements that are provided in accordance with the present invention. FIG. 3 is an enlarged elevation view taken as indicated by line 3–3 on FIG. 1 and showing the thing that is positioned by the controller apparatus of the present invention, in this case being the electrode of the electrical arc furnace positoned through means of a hydraulically operated ram. FIG. 4 is an enlarged detailed sectional view of one of the controllers shown in FIG. 2 and taken substantially as indicaed by line 4–4 in FIG. 2. FIG. 5 is a sectional view taken as indicated by line 5–5 on FIG. 4. FIG. 6 is an electrical diagram illustrating the relationship of mechanical and electrical elements as they are associated and related to the first form of the invention herein disclosed. FIG. 7 is a diagram similar to a portion of that shown in FIG. 6 and shows a second form of the invention. FIG. 8 is an electrical diagram similar to FIG. 6 and illustrates a third form of the invention, and FIG. 9 is a diagrammatic view illustrating the effect of lagging phase angle which takes place during operation of the circuitry.

From the foregoing statement of the problems involved and from the preceding objects it should be readily apparent that the present invention, in its broad sense, is applicable to the control and variable positioning of many things including the electrodes of electrical arc furnaces. Although the present invention is disclosed in connection with the positioning of an electrical element in the form of an electrode, it is to be understood that other things, devices, or elements are within the scope of the invention, in that they too can be positioned in the same way using the dynamic control apparatus that I provied, all as hereinafter described, and as practically applied to a preferred embodiment or application, namely as applied to an electrical arc furnace.

Throughout the drawings I have shown the present invention in its practical application to an electrical arc furnace 10 operated from an instrument or control panel 11. The arc furnace 10 involves a tiltable furnace 12 adapted to receive a charge of materials to be melted and to act as a reservoir for molten metal as the heat is prepared for pouring. The furnace 12 is suitably lined with refractory material and the furnace is characterized by the electrodes 13 that depend freely through openings in the roof 14, to be positioned in proximity to the bath of molten metal contained in the furnace. The usual furnace 10 involves a plurality of electrodes 13 to be energized through a multiphase power source, usually a three-phase power source in which case there are three electrodes 13, the electrodes being identical and suitably spaced. The electrodes extend downwardly through the roof 14 on parallel axes, equally spaced and normal to the level of molten metal to be processed.

In accordance with a conventional furnace construction the electrodes are movable carbon elements adapted to reciprocated toward and away from the charge of material to be acted upon. Since the three electrodes are alike and since they are reciprocably carried in the same way, a descripton of one suffices for all. As shown in general detail, the electrode is a straight cylindrical element that is rigidly mounted on an arm 15 that extends horizontally over the roof 14 of the furnace. The arm 15 is shiftably supported by a piston element or ram 16 that is operable in a cylinder 17 positioned alongside the furnace 12. In practice the cylinder 17 is rigid with the furnace 12 and is disposed on axis spaced from and parallel with the central axis of the furnace. The cylinder 17 opens upwardly with the ram 16 projecting therefrom to carry the arm 15, it being apparent that the movement of the ram 16 causes displacement of the arm 15 and electrode 13 carried thereby. Thus, the electrode 13 is subjected to linear motion in order to infinitely vary the placement of the lower terminal end thereof in the desired proximity to the charge of material in the furnace 12. The three electrodes 13 are individually powered through one of each of the three phases of electrical power supplied through power lines 18 and a power transformer to be later described.

In order to raise and lower the electrode 13 fluid is metered into the cylinder 17 through a duct 19 under control of a valve V that is operated and/or positioned by the dynamic controller apparatus that I provide. The valve is a pressure supply and exhaust valve and is of a type adapted to meter the flow of fluid so as to vary the volume of flow. Therefore, the valve V receives fluid pressure from a motor driven pump P through a pressure duct 20 to be throttled or stopped and/or directed through the duct 19 to the cylinder 17, and the valve V exhausts fluid from the duct 19 and cylinder 17 to return it to a reservoir 21 and as clearly indicated there is a valve V for each electrode 13 to be positioned and controlled.

In accordance with the invention, I provide apparatus that is dynamic in its nature and adapted to sense the conditions relating to the electrode 13 and to place said electrode in an exact required position. The apparatus is electromechanical and adapted to be actuated by means of electrical energy and is characterized by its ability to immediately operate to place the electrode in any infinitely variable position. As clearly illustrated, the apparatus involves an electromechanical actuator X, and a condition sensing means Y or Z.

The electromechanical actuator X can directly engage and move the thing to be positioned, or as is the case illustrated where the electrode to be moved is extremely large, then a servo system is preferable, for example the fluid pressure means involving the pump P and cylinder and piston means 16–17 as above described and under control of the valve V that is positioned by the actuator X. The condition sensing means Y is a sensory means, to be later described, and it is associated with the electrode 13 and involves elements combined so as to energize the actuator X in response to the demands imposed thereon by the conditions at said electrode. The conditions referred to are the critical electrical conditions in the proximity of the terminal end of the electrode and charge of material in the furnace 12.

The electromechanical actuator X is provided to move and position the controlling element of the valve V and involves, generally an inner field pole A, an outer field pole B, a field winding C, a flux conducting housing D, and an armature assembly E. The actuator X is formed about a central longitudinal axis, the elements A, B, C, D and E being formed concentric with said axis.

The actuator X is built around a central core 22 in the form of a cylindrical element formed concentric with the longitudinal axis of the actuator, preferably a single solid body of iron, or the like, adapted to be magnetically excited and/or charged. The core 22 has an outer cylindrical wall 24, a lower end 25, and an upper end 26. The ends 25 and 26 are preferably flat and are normal to the longitudinal axis of the structure and the core 22 is characterized by a central bore 27 that extends between the ends 25 and 26 and which is provided to pass the driving element of the armature, as hereinafter described. The outer end of the core A is flanged at 28 to connect with the housing D.

The field pole A is carried at the upper end of the core 22 and is preferably formed integrally therewith. As shown, the pole A is an annular part separated from the wall 24 of the core so that there is an annular outwardly facing cylindrical pole face 23 of limited axial extent at the inner end of the core 22. The pole face 23 is of slightly larger diameter than the wall 24 so that the driving element of the armature assembly E (as hereinafter described) clears the body of the core.

The outer field pole B is carried at the upper end of the core 22 and is supported by the housing D to be opposed to the inner field pole A. As shown, the pole B is an annular part surrounding the pole A and is spaced therefrom leaving an annular space or gap therebetween. The field pole B has an inner end face 29 in the plane of the end 26 of the core 22 and has a cylindrical bore so that there is an annular inwardly facing cylindrical pole face 30 of substantially the same limited axial extent as the pole face 23 above described. As shown, the pole faces 30 and 23 are concentric with each other and are opposed, the annular space or gap therebetween being provided to pass the main body and winding or windings of the armature assembly E.

The field winding C is a simple circular winding of electrical conductors that surround the core A. The winding C may be of any suitable cross sectional configuration, preferably rectangular, and an annular opening or cavity is provided that surrounds the core 22 in order to accommodate the winding C and movement of the armature assembly E. It will be apparent that energization of the field winding C, preferably variable, will magnetize the core 22, it being understood that permanent magnets (not shown) can be used in lieu of windings, if so desired.

The flux conducting housing D is provided to carry the outer field pole B and to conduct magnetic flux from the outer end of the core 22 to the pole B. The housing D is in the form of a cylindrical case that supports and encases the field winding C and which is made of suitable magnetic flux conducting material to carry the flux between the outer field pole B and the inner field pole A through the central core 22.

The armature assembly E is shiftably carried in the field assembly thus far described to be reciprocated upwardly and downwardly, or axially thereof, and involves, generally, a cylindrical armature 31, a driving head 32 and a supporting drive shaft 33. The armature 31 is carried to operate between the field poles A and B and is connected to the supporting drive shaft 33 by means of the driving head 32.

The cylindrical armature 31 is a straight tubular element having an inner wall of slightly larger diameter than the pole face 23 and an outer wall of slightly smaller diameter than the pole face 30 and so that it freely passes through the gap or opening between the poles A and B to enter the cavity between the core A and housing D. The armature 31 is elongate and of substantial axial extent for substantial movement along the longitudinal axis of the structure.

As illustrated, the armature 31 involves a carrier 35 about which circular windings 36 and/or 36' are wound and supported as hereinafter described. The carrier 35 is preferably a thin-walled member of non-magnetic material, for example of aluminum, establishing the inner wall, giving proper cylindrical form to the armature 31, and also providing damped motion due to eddy-current development. As shown, the carrier 35 is thin-walled for lightness and is provided with a radially disposed flange 34 at the upper end thereof, which flange is preferably turned inwardly and in a plane normal to the longitudinal axis of the armature. The flange 34 is employed to secure the carrier 35 and windings 36 and/or 36' of the armature to the driving head 32, as hereinafter described.

The driving head 32 of the armature assembly E is secured to the flange 34 of the carrier 35 and is preferably a spider-like part having a central hub 40 joined integrally with the flange 34 by legs 42 connecting the hub 40 and flange 34. The hub 40 is provided with a boss 43 for receiving the inner end of the drive shaft 33.

The windings 36 and/or 36' are in the form of wire or the like and surround the carrier 35 establishing a uniform wall of electrical conductors. A body of binding material, any suitable resin filler or the like, is applied to the windings 36 and/or 36' and to the entire armature assembly in order to fill any and all interstices therein and to secure the elements of the armature into a single homogeneous unit. Since the armature 31 is a reciprocating element, its light weight is an important factor requiring little power for its operation or reciprocation per se. Therefore, the carrying power of the armature assembly E is increased to a maximum degree.

The supporting and driving shaft 33 of the armature assembly E is shiftably carried in the bore 27 that extends through the core 22 and has driving connection with the head 32. As clearly shown in the drawings, the bore 27 is provided with upper and lower counterbores that carry bearing sleeves or bushings 45 and 46, respectively. The shaft 33 is a tubular shaft made of light weight materials, for lightness of construction, and it extends from the head 32 and passes through the bore 27 to terminate below the core 22. The bushings 45 and 46 are anti-friction bearings that slidably support the shaft 33 so that the shaft is free to reciprocate. The boss 43 on the hub 40 of the head 32 threadedly receives the inner end of the shaft 33 for rigid connection thereto. Since the shaft 33 is light weight, like the armature 31, the armature assembly E has a low inertia factor for sensitiveness of operation.

In accordance with the preferred form of this invention, wherein a null position is sought to be maintained and wherein movement is required in opposite directions from said null position, a centering means is provided that centrally positions the armature assembly E. That is, the centerings means is provided to hold the assembly E in a normal intermediate position relative to the field poles 23 and 30. In its simplest and preferred form, the centering means is a spring means involving upper and lower compression springs 47 and 48, respectively, that oppose each other and which centrally position the armature assembly E when they are both fully extended, or substantially so. The springs 47 and 48 are helical springs seated at the upper end 16 and lower end 15 of the core 22, respectively, the spring 47 operating against the head 32 of the armature assembly E and the spring 48 operating against a collar 49 secured to the shaft 33 below the core 22. It will be apparent how the armature assembly E is centralized by the springs 47 and 48.

It is preferred that the shaft 33 and armature assembly E be prevented from turning in which case I provide a guide post 50 that projects from the assembly of field elements on an axis spaced laterally from the central axis of the actuator X and shaft 33. There is a guide bushing 51 in the head 32 and that slidably engages the post 50, and there are upper and lower stops 52 and 53 that limit the travel of the moving elements. Further, suitable flexible electrical cables 54 extend from the head 32 for energizing the windings 36 and/or 36', said cables being fastened to insulators 55 or the like, on a protective housing 56 that encloses the upper end of the actuator X.

The condition sensing means Y is one of the sensory circuits that I provide and which is responsive to the conditions at the electrode 13, namely the conditions of the electrical power that establishes the arc, and operates to energize the electromechanical actuator X hereinabove described. The condition sensing means Y responds to voltage and/or amperage and operates to activate the actuator X to move the armature assembly E thereof. In the case under consideration, the ram 16 is held elevated by entrapping fluid under pressure in the cylinder 17 beneath said ram, in which case the valve V has a neutral or null position where both the inlet and exhaust ports thereof are closed. When the arc conditions require lifting of the electrode 13 the movable valve element of the valve V must be moved (lifted) to open the inlet port of the valve to the duct 19, and conversely when the arc conditions require lowering of the electrode 13 the movable valve element of the valve V must be moved (lowered) to open the exhaust port of the valve to the duct 19. Thus, it will be apparent why the shaft 33 of the actuator X is centered in a null position by the springs 47 and 48.

From the foregoing it will now be apparent that it is necessary to power the armature assembly E, to drive it upwardly or downwardly as conditions of the arc require. In its simplest form the present invention requires but a single winding 36, however with the circuitry of the means Y a second winding 36' is provided in opposition to the first mentioned winding 36, that is the windings are oppositely wound or so connected that they bias the armature in opposite axial directions, and for all practical purposes they can be of substantially equal capacity or strength. In carrying out this invention, with either the means Y, Y' or Z, both voltage and amperage conditions at the arc struck by the electrode 13 are separately sensed by the said means and are independently used to effect positioning of the armature E.

In FIG. 6 of the drawings I have illustrated one embodiment of the condition sensing means, the means Y, from which it will be apparent that the voltage and current conditions at the electrode are separately detected. The voltage is taken from the power lines 18 at the secondary windings of the three-phase transformer 60 that powers the electrodes 13 (only the secondary windings of the transformer 60 are shown), and the phase to be sensed is tapped by a conductor 61.

As shown, the voltage side of the means Y involves means to reduce and to control the voltage for producing a signal of useable proportion and also involves rectifying means to finally produce a D.C. signal. In carrying out the foregoing, the initial voltage is isolated by an isolating transformer 62 energized from the conductor 61. The secondary of the transformer 62 is connected in parallel to a variable transformer 63, whereby suitable control level of the signal voltage is established. In actual practice, I provide an additional output transformer 64 which is wound or balanced to deliver signal voltage within the required range, the said transformers 62, 63 and 64 being arranged in a series and delivering an A.C. current signal at a pair of conductors 65 and 66. The signal is finally processed by a rectifier 67, for example a selenium plate rectifier, as indicated, the output conductors 68 and 69 of the rectifier delivering low voltage D.C. signal to one of the windings of the armature E, for instance to the winding 36. A capacitor 68' is provided to smooth out the pulsating D.C. current. It will be apparent that the signal delivered by the conductors 68 and 69 will vary depending upon the voltage condition at the transformer 60 in respect to ground as sensed through the conductor 61.

The current, or amperage, side of the means Y involves means to reduce and control the current for producing a signal of useable proportion and also involves a rectifying means to finally produce a D.C. signal. In carrying out the foregoing, the initial current is sensed by a current transformer 70 associated with the particular phase involved, there being a pair of conductors 71 and 72 extending from the secondary of the transformer 70. One of said conductors is grounded at 73, preferably the conductor 71, and a voltage limiting choke 74 extends between the two conductors, followed by a series protective resistance 75 in the conductor 72, all to the end that current is reduced to the desirable level or proportion for use as a signal. A variable resistance 76 is shunted between the conductors 71 and 72 whereby suitable control of the signal current is gained, that is, voltage and amperage, the signal thus far being A.C. The signal is finally processed by a rectifier 77, for example a selenium plate, as indicated, the output conductors 78 and 79 of the rectifier delivering a low current D.C. signal to one of the windings of the armature E, for instance the winding 36'. A capacitor 78' is provided to smooth out the pulsating D.C. current. It will be apparent that the signal delivered by the conductors 78 and 79 will vary depending upon the current conditions at the power line 18 associated with the transformer 70.

As is clearly indicated in the diagram, the field winding 100 of the electromagnetic unit is energized through a source of D.C. through conductors 101, one or more of which is controllable by means of a variable resistance, or the like, as indicated at 102.

With the voltage and current sensing means Y, hereinabove described, the two armature windings 36 and 36' are employed in opposition to each other. The winding 36 is biased by the voltage side of the circuit while the winding 36' is biased by the current side of the circuit. In any case, with the controls that are provided, the two sides of the circuit, namely the voltage and amperage sides, are balanced in order to secure the desired null position of the armature E.

In FIG. 7 of the drawings I have illustrated a second embodiment of the condition sensing means, the sensing means Z, from which a single armature winding 36 is energized. The sensing means Z is, for the most part, the same as the means Y above described and differs only in the final output of the signal to the armature E, being characterized by a bridge circuit that combines the separate voltage and current signals, or computes them, so that they are useable in a single armature winding 36.

As indicated, the means Z involves a bridge type circuitry that receives an A.C. voltage signal from the conductors 68 and 69 and receives an A.C. amperage or current signal from the conductors 78 and 79. In the form of the invention now under consideration, the voltage and current signals are rectified, preferably by selenium plate type or solid state rectifiers 69 and 77, respectively, the same as in the first form of the invention. However, in this case the armature winding 36 and two rectifiers 69 and 77 are arranged in a bridge formation. Specifically, and as is preferred, the plus and minus sides of the voltage and current rectifiers are connected to one end of the winding 36, as by conductors 80 and 81, while the opposite sides of the rectifier, respectively, are connected to the other end of the winding 36, as by conductors 82 and 83. As a result, opposite potentials of the rectifiers are joined and interconnected through the winding 36, and so that there will be a balanced no-flow condition when values are equal at the voltage and amperage sides of the over-all circuitry. In order to provide control and/or adjustment, I provide a variable resistor 85 between the conductors 80 and 81 and with a moving contact 86 leading to the winding 36. Thus, it will be apparent that there is flow of current through the winding 36, one way or the other, only when and depending upon the amount of unbalance between the voltage and amperage sensed through the conductors 61 and 71 and 72.

The signal voltage and amperage taken from the power lines 18 by the transformers 60 and 70 are employed to balance the armature assembly E and valve V at a null position arbitrarily determined by power input for which the device is set. If plus or minus variations occur the resultant of the signals will cause a variant from the null position. If current goes up and voltage goes down, or vice versa, the present apparatus maintains equilibrium. For example, when there is a change in power input on the plus side there is normally an increase in current input and due to reactance there is generally a voltage drop across the arc. And, of course, the reverse situation occurs when power input is on the minus side. In any case, a variation in power input is instantly detected and represented in disproportionate signals to the winding 36 or two windings 36 and 36', as the case may be. In case of the single winding 36 the bridge circuit computes and combines the two signals, and in the case of the two windings 36 and 36' one overbiases the other. The opposite ends of the winding 36, or the windings 36 and 36' are energized proportionately or disproportionately, as circumstances require, through the condition sensing means Z or Y in order to move the shiftable valve element of the valve V, all to the end that the electrode 13 is placed and/or moved or held in any exact required position.

In FIG. 8 of the drawings I have illustrated a third embodiment of the condition sensing means, the means Y', from which it will be apparent that the voltage and current conditions at the electrode are separately detected and also intensified by a means T while employing the advantages of both circuits Y and Z. That is, the general and advantageous characteristics of means Y are maintained and are cooperatively related to the advantages of the means Z and namely to the single winding 36 feature.

As shown in FIG. 8 the voltage side of the means Y' involves means to reduce and to control the voltage for producing a signal of useable proportions and also involves rectifying means incorporated in a bridge detecting circuit. In carrying out the foregoing, the initial voltage is introduced to the circuit and is isolated by a potential transformer 160 with a tapped primary energized from line 18. The secondary of the transformer 160 is connected in parallel to a variable transformer 162, whereby suitable control level of the signal voltage is established, the said transformers 160 and 162 being arranged in a series and delivering an A.C. current signal to a pair of conductors 165 and 166. The signal is finally produced by a rectifier 167 in the bridge detecting circuit, for example a silenium plate rectifier as indicated, at output conductors 168 and 169 of the rectifier delivering a low voltage D.C. signal to the winding 36 of the armature E, in this instance a single winding 36. It will be apparent that the signal delivered by the conductors 168 and 169 will vary depending upon the voltage condition at the transformer 160 in respect to ground as sensed through the conductor 161.

The current, or amperage, side of the means Y' involves means to reduce and to control the current for producing a signal of useable proportion and also involves a rectifying means incorporated in the said bridge detection circuit. In carrying out the foregoing, the initial current is sensed by a current transformer 170 associated with the particular phase involved, there being a pair of conductors 171 and 172 extending from the secondary of the transformer 170, the primary thereof being the line 18. In practice, I provide an impedance changing transformer 173 that has a tapped secondary whereby suitable control level of the signal current is established and all to the end that current is reduced to the desirable level or proportion for use as a signal. The signal is finally produced by a rectifier 177, for example a selenium plate rectifier as indicated, the output conductors 178 and 169 of the rectifier delivering a low current D.C. signal to the winding 36. In this form of the invention the conductor 169 is an output conductor that is common to the two rectifiers 167 and 177. It will be apparent that the signal delivered by the conductors 178 and 169 will vary depending upon the current condition at the power line 18 associated with the transformer 170.

Again, it is preferred that there be a field winding 100 with a variable D.C. power supply through conductors 101, for example the winding at 100 energizes an electromagnet through a circuit energized through a rectifier and variable transformer.

From the foregoing it will be seen that the means Y' involves a bridge detection circuit which comprises in general the two rectifiers 167 and 177, and the single winding 36. Also, and in accordance with this third form of the invention, the said bridge detection circuit involves matched resistors 180 and 181, said electrical components 167 and 177, 180 and 181 being arranged in the manner of a Wheatstone bridge, with the output conductors 168 and 178 extended to one end of the matched resistors 180 and 181 respectively, the other ends of the two resistors being joined to a common output conductor 179. The winding 36 is series connected between the output conductors 169 and 179 in a manner analgous to a galvanometer. Thus, the bridge detection circuit involves the four matched bridge components and is also said to involve the winding 36.

It is preferred that the bridge detection circuit be initially balanced by means of a variable resistor 182 disposed, for example, between the rectifiers 167 and 177 and with the movable contact thereof contacted with the common output conductor 169. It will be apparent how the bridge detection circuit can be initially balanced and the adjustment of resistor 182 fixed.

In accordance with the third form of the inevntion I provide the signal intensifying means T which is essentially a power factor boosting means and which involves a power factor boosting transformer 174 with its primary across the output of the potential transformer 160 and with its secondary in series with and opposing the secondary of the impedance changing transformer 173. A typical and comparative phase shift is diagrammatically illustrated in FIG. 9 where it will be apparent that only at unity power factor will the secondary voltage of transformer 174 be fully subtractive from the secondary voltage of transformer 173. The transformed secondary voltage of the power factor booster transformer 174 acts as the anchor to compare the lagging phase angle of the current. The said lagging phase angle is a function of the current flowing and the inductive reactances of the circuit, both factors being controllable within limits, and in the three phase system shown each phase reactance is mutually dependant upon that of the others. Therefore, the less voltage that is subtracted from the secondary of transformer 173, the greater is the remainder available to cause operation of the winding 36 to thereby cause raising of the electrode and thereby increasing arc resistance and arc voltage and resulting in increasing of the power factor. It is to be understood, in view of the foregoing, that a transformer such as the transformer 174 can have its primary associated with the secondary of transformer 170 and its secondary in series opposition in the secondary circuit of a transformer such as transformer 160, in which case the intensifying action is reversed as between voltage and amperage.

A pressure sensitive automatic shut-off valve 190 of the pilot operated type operates to close the hydraulic system and lock the electrode in position whenever the pump P is inoperative. Conversely, the valve 190 operates to open the hydraulic system whenever the pump P is in operation.

The third form of the invention hereinabove described has become the preferred form, wherein there is an intensifying means T operable between the voltage-potential circuit and amperage-current circuit, wherein there is a bridge detection circuit comprising matched rectifiers and resistors with a balancing means, and wherein there is a single winding 36 that substantially reduces the mechanical requirements of the electromechanical actuator X. The current mode circuit operates to raise the electrode, as above described, while the potential mode circuit operates to lower the electrode, the primary of transformer 160 and the secondary of transformer 173 being tapped at a selected voltage at which the combined circuit is proposed to operate. The voltage from transformer 160 is adjustably transformed by the controlling transformer 162 and the voltage impressed on the bridge potential circuit determines the current that must flow in the line 18 in order to balance the said bridge circuit. Said bridge detection circuit functions as an electrical "balanced beam." The armature winding 36 which is directly connected to the bridge circuit is also directly connected mechanically to the spool or moveable element of the valve V, a balanced valve, and all to the end that there is a variably predetermined and controlled rate of flow in the hydraulic system as a function of any error signal flowing in the electrical circuit.

Having described only typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. A dynamic control apparatus for infinitely variable positioning of an electrode in an electrical arc furnace and the like and responsive to electrical conditions associated with said electrode, and including, a condition sensing means comprising a detection circuit for generating a signal proportionate to the difference between the voltage and amperage condition at said electrode, and an electromechanical actuator comprising means for generating a magnetic field and an armature with a single winding and movable relative to said field and coupled directly to an element controlling the position of said electrode, means normally centering the armature at a null position with respect to the said field, said armature winding being supplied with a signal from said sensing means to shift the armature proportionally in opposite directions from the null position as a function of said signal to variably move and controllably position the said element for variably positioning the electrode.

2. A dynamic control apparatus for infinitely variable positioning of an electrode in an electric arc furnace and the like and responsive to electrical conditions associated with said electrode, and including, a condition sensing means comprising a detection circuit for generating a signal proportionate to the difference between the voltage and amperage condition at said electrode, and an electromechanical actuator comprising means for generating a magnetic charged field and an armature with a single winding and movable relative to said field and coupled directly to an element controlling the position of said electrode, said element being variably positioned by movement of the armature relative to the field, centering means biased to engage and center the armature and element coupled thereto in a null position, said armature winding being supplied with a signal from said sensing means operable to variably move and controllably position the said element for variably positioning the electrode.

3. A dynamic control apparatus for infinitely variable positioning of an electrode in an electric arc furnace and the like and responsive to electrical conditions associated with said electrode, and including, a condition sensing means comprising a detection circuit for generating separate signals proportionate to the difference between the voltage and amperage conditions at said electrode, and an electromechanical actuator comprising means for generating a magnetic field and a low inertia armature with a single winding and movable relative to said field and coupled directly to an element controlling the position of said electrode said element being variably positioned by movement of the armature relative to the field, centering means biased to engage and center the armature and element coupled thereto in a null position, said armature winding being supplied with the difference between the combined voltage and amperage signals from the sensing means and operable to move and controllably position the said element for variably positioning the electrode.

4. A dynamic control apparatus for infinitely variable positioning of an electrode in an electric arc furnace and the like and responsive to electrical conditions associated with said electrode, and including, a condition sensing means comprising a detection circuit for generaitng separate signals proportionate to the difference between the voltage and amperage conditions at said electrode, said means having a bridge circuit combining the voltage and amperage signals, and an elecrtomechanical actuator comprising means for generating a magnetic field and a low inertia armature with a single winding and movable relative to said field and coupled directly to an element controlling the position of said electrode, said element being variably positioned by movement of the armature relative to the field, centering means biased to engage and center the armature and element coupled thereto in a null position, said single winding being supplied with the difference between the voltage and amperage signals from the sensing means and operable to move and controllably position the said element for variably positioning the electrode.

5. A dynamic control apparatus for infinitely variable positioning of an electrode in an electric arc furnace and the like and responsive to electrical conditions associated with said electrode, and including, a condition sensing means comprising a detection circuit for generating a single signal proportionate to the difference between the voltage and amperage conditions at said electrode, and an electromagnetical actuator comprising means for generating a magnetic charged field and a low inertia reciproable armature with a single winding and movable relative to said field and coupled directly to an element controlling the position of said electrode, said element being variably positioned by reciprocal movement of the armature relative to the field, centering means biased to engage and center the armature and element coupled thereto in a null position, said single winding being supplied with the difference between the voltage and amperage from the condition sensing means and operable to move and controllably position the said element for variably positioning the electrode.

6. A dynamic control apparatus for infinitely variable positioning of an electrode in an electric arc furnace and the like and associated with a single phase of electrical power and responsive to said phase, and including, a condition sensing means comprising a power detection circuit adapted to detect the difference between the voltage and amperage conditions at said phase and for generating a signal proportionate thereto, and an electromechanical actuator comprising means to generate a magnetic field and a reciprocal armature with a single winding and movable relative to said field, said armature being connected directly to an element controlling the position of said electrode and the single winding thereof being supplied with the proportionate signal, centering means biased to engage and center the armature and element coupled thereto in a null position, said winding being operable to move and controllably position the said element for variably positioning the electrode.

7. A dynamic control apparatus for infinitely variable positioning of an electrode in an electric arc furnace and the like responsive to electrical conditions associated with said electrode, and including, a condition sensing means comprising a detection circuit for generating a signal proportionate to the difference between the voltage and amperage condition at said electrode, and an electromechanical actuator comprising means for generating an electromagnetic field and an armature with a single winding and movable relative to said field and coupled directly to an element controlling the position of said electrode, said element being variably positioned by movement of the armature relative to the field, control means variably energizing the electromagnetic field, centering means biased to engage and center the armature and element coupled thereto in a null position, said armature winding being supplied with the signal of said sensing means and operable to variably move and controllably position the said element for variably positioning the electrode.

8. A dynamic control appartus for infinitely variable positioning of an electrode in an electric arc furnace and the like and responsive to electrical conditions associated with said electrode, and including, a condition sensing means comprising a detection circuit for generating separate signals proportionate to the difference between the voltage and amperage conditions at said electrode, signal intensifying means comprising series opposed transformers in the voltage and amperage sides of the power detection circuit respectively, and an electromechanical actuator comprising a magnetic means for generating charged field and a low inertia armature with a single winding and movable relative to the field and coupled directly to an element controlling the position of said electrode, said element being variably positioned by movement of the armature relative to the field, centering means biased to engage and center the armature and element coupled thereto in a null position, said armature winding being supplied with the intensified voltage and amperage signals of the sensing means and operable to move and controllably position the said element for variably positioning the electrode.

9. A dynamic control apparatus for infinitely variable positioning of an electrode in an electric arc furnace and the like and responsive to electrical conditions associated with said electrode, and including, a condition sensing means comprising a detection circuit for generating a signal proportionate to the difference between the voltage conditions at said electrode and a detection circuit adapted to produce a signal proportionate to the amperage conditions at said electrode, said means having a bridge detection circuit combining the separate voltage and amperage signals into a combined signal, and an electromechanical actuator comprising means for generating a magnetic charged field and a low inertia armature with a single winding and movable relative to the field and coupled directly to an element controlling the position of said electrode, said element being variably positioned by movement of the armature relative to the field, centering means biased to engage and center the armature and element coupled thereto in a null position, said armature winding being supplied with the difference between the voltage and amperage signal of the sensing means and operable to move and controllably position the said element for variably positioning the electrode.

10. A dynamic control apparatus for infinitely variable positioning of an electrode in an electric arc furnace and the like and responsive to electrical conditions associated with said electrode, and including, a condition sensing means comprising a detection circuit for generating a signal proportionate to the voltage conditions at said electrode and a detection circuit adapted to produce a signal proportionate to the amperage conditions at said electrode, said means having a bridge detection circuit combining the separate voltage and amperage signals into a combined signal, signal intensifying means comprising series opposed transformers and one in the said power detection circuit sensing voltage and one in the said power detection circuit sensing amperage and one of said transformers being connected to couple one of said detection circuits to the bridge detection circuit, and an electromechanical actuator comprising means for generating a magnetic field and a low inertial armature with a single winding and movable relative to the field and coupled directly to an element controlling the position of said electrode, said element being variably positioned by movement of the armature relative to the field, centering means biased to engage and center the armature and element coupled thereto in a null position, said armature winding being supplied with the difference between voltage and amperage signal of the sensing means and operable to move and controllably position the said element for variably positioning the electrode.

11. A dynamic control apparatus for infinitely variable positioning of an electrode in an electric arc furnace and the like and responsive to electrical conditions associated with said electrode, and including, a condition sensing means comprising, a potential transformer sensing voltage conditions at said electrode, a current transformer sensing amperage conditions at said electrode, and a bridge detection circuit having a rectifier connected to the potential and current transformer respectively and a matched resistor for each rectifier and combining the separate voltage and amperage signals into a combined signal, and an electromechanical actuator comprising means for generating a magnetic field and a low inertia armature with a single winding and movable relative to the field and coupled directly to an element controlling the position of said electrode, said element being variably positioned by movement of the armature relative to the field, centering means biased to engage and center the armature and element coupled thereto in a null position, said armature having winding being supplied with the difference between the voltage and amperage signal of the sensing means and operable to move and controllably position the said element for variably positioning the electrode.

12. A dynamic control apparatus for infinitely variable positioning of an electrode in an electric arc and the like and responsive to electrical conditions associated with said electrode, and including, a condition sensing means comprising, a potential transformer sensing voltage conditions at said electrode, a current transformer sensing amperage conditions at said electrode, and a bridge detection circuit having a rectifier connected to the potential and current transformer respectively and a matched resistor for each rectifier and combining the separate voltage and amperage signals into a combined signal, signal intensifying means comprising an impedance changing transformer with its primary energized by the secondary of the current transformer and a power factor booster transformer in parallel with the secondary of the potential transformer and said two transformers of the signal intensifying means with their secondaries in series opposed and a circuit to the bride detection circuit, and an electromechanical actuator comprising means for generating a magnetic field and a low inertia armature with a single winding and movable relative to the field and coupled directly to an element controlling the position of said electrode, said element being variably positioned by movement of the armature relative to the field, centering means biased to engage and center the armature and element coupled thereto in a null position, said armature a single winding being supplied with the difference between the voltage and amperage signal of the sensing means and operable to move and controllably position the said element for variably positioning the electrode.

References Cited by the Examiner

UNITED STATES PATENTS

| 2,519,599 | 8/1950 | Payne | 314—61 |
| 2,807,706 | 9/1957 | Oezer | 314—61 X |
| 2,921,107 | 1/1960 | Toothman et al. | 13—13 |

FOREIGN PATENTS 524,989   5/1956   Canada.

RICHARD M. WOOD, *Primary Examiner.*

JOSEPH V. TRUHE, *Examiner.*